United States Patent
Rohr et al.

(10) Patent No.: US 6,344,573 B1
(45) Date of Patent: Feb. 5, 2002

(54) PROCESS FOR EXTRACTION AND CONCENTRATION OF LIPOSOLUBLE VITAMINS AND PROVITAMINS, GROWTH FACTORS AND ANIMAL AND VEGETABLE HORMONES FROM RESIDUES AND BY-PRODUCTS OF INDUSTRIALIZED ANIMAL AND VEGETABLE PRODUCTS

(75) Inventors: Rodolfo Rohr; Jose Anibal Trujillo-Quijano, both of Campinas (BR)

(73) Assignee: Resitec Industria Quimica LTDA, Duane de Caxias (BR)

( * ) Notice: Subject to any disclaimer, the term of this patent is extended or adjusted under 35 U.S.C. 154(b) by 0 days.

(21) Appl. No.: 09/668,370

(22) Filed: Sep. 25, 2000

(51) Int. Cl.$^7$ ................................................. C07C 1/00
(52) U.S. Cl. ............................ 554/19; 554/8; 554/195; 554/202
(58) Field of Search .............................. 554/8, 19, 195, 554/202

(56) References Cited

U.S. PATENT DOCUMENTS

| | | | | |
|---|---|---|---|---|
| 3,369,034 A | * | 2/1968 | Chalmers et al. | 260/412.1 |
| 4,101,562 A | * | 7/1978 | Bhandari et al. | 260/419 |

* cited by examiner

*Primary Examiner*—Deborah D. Carr
(74) *Attorney, Agent, or Firm*—Arent, Fox, Kintner, Plotkin & Kahn

(57) ABSTRACT

A process for the extraction and concentration of unsaponifiable substances, containing liposoluble vitamins and provitamins, growth factors and animal and vegetable hormones, from residues of the industrialization of animal or vegetable products. This process does not require the use of solvents. Its main goal is to obtain the separation of these "valuable products", by means of distillation/evaporation at high vacuum, and the production of fatty acids and other high quality organic acids, once the recovery of the unsaponifiable fraction of residues from the industrialization of animal or vegetable products, is of great commercial interest. This is due to the fact that the "valuable products", have in many cases, vitamin activity, such as: tocopherols, sterols, carotenoids, vitamin A, vitamin K, vitamin D, while other products present cholesterol reducing properties, such as: sterols, tocotrienols, esqualene, etc; or even, anti-oxidant properties like: tocopherols, tocotrienols; as well as anti-carcinogenic properties such as: tocotrienols, sterols, lycopene, and alpha-carotene. Some other products are used as a structure for chemical-synthesis, like for example: sterols for hormone synthesis, vitamin D synthesis; and other products which have nutraceutic properties, apart from the commercial interest in some products, the cosmetic formulas of which present emulsifying properties, emulsion stabilizers and/or viscosity modifiers like for example sterols.

21 Claims, No Drawings

PROCESS FOR EXTRACTION AND CONCENTRATION OF LIPOSOLUBLE VITAMINS AND PROVITAMINS, GROWTH FACTORS AND ANIMAL AND VEGETABLE HORMONES FROM RESIDUES AND BY-PRODUCTS OF INDUSTRIALIZED ANIMAL AND VEGETABLE PRODUCTS

The invention stated herewith, is a new process for the extraction and concentration of unsaponifiable substances, containing liposoluble vitamins and provitamins, growth factors and animal and vegetable hormones, called from this point out as "valuable products", obtained from animal or vegetable products, or even from the residues of the industrialization of these same products, without the need for solvents. The objective here is the extraction and concentration of the "valuable products", by means of high vacuum distillation/evaporation, also producing fatty acids and other high quality organic acids, by hydrolyzing the residues obtained from distillation/evaporation.

The novelty of this new invention process lies in the fact that while the processes used nowadays, to separate and concentrate "valuable products", use solvents, taking advantage of the difference of solubility between unsaponifiable substances and their soap matrix, this new process uses, by means of high vacuum distillation/evaporation, the difference of volatility between volatile unsaponifiables and fatty acid, rosin acid and other practically non-volatile organic acid soaps, under the same conditions.

The solvents available at present are not sufficiently selective to obtain, though the current process, a reasonable separation between the unsaponifiable components and the fatty acids, the rosin acid soaps, etc. Due to this, many times it is necessary to use more than one solvent, which in turn complicates and increases tremendously the cost of recovery and recycling of the same.

In the case of extraction by distillation, the difference between the boiling point of volatile products, such as unsaponifiable components, and the boiling point of different organic acid soaps is so remarkable, that separation is possible at a high level of efficiency. Prior to the invention of this new process, the problem was the very high melting point, close to the decomposition temperature of sodium or potassium, fatty acid, rosin acid soaps, etc. Even when melted, these soaps form extremely viscous liquids, which make industrial handling difficult. While at the high temperature necessary to maintain their flow, around 200° C., these soaps are in permanent decomposition, compromising the extraction output and the quality of the final product.

This new process has solved this problem, transforming sodium or potassium soaps, obtained from the saponification of animal or vegetable oils and fats processing, and from the saponification of the residues obtained in the industrialization of the same; rich in unsaponifiables where "valuable products" can be found; into metallic soaps, which have a lower melting point, and when melted, have low enough viscosity to help handling during the distillation/evaporation process.

The recovery of the unsaponifiable fraction of the residues from the industrialization of animal or vegetable products, is of great commercial interest, due to the fact that, in many cases, the "valuable products" have vitamin activities such as: tocopherols (vitamin E), tocotrienols, carotenoids, vitamin A, vitamin K, vitamin D, while the same products present cholesterol reducing properties such as: sterols, tocotrienols; as well as anticarcinogenic properties such as: tocotrienols, sterols, lycopene, alphacarotene; and some other products which can be used as a chemical synthesis structure, like for example: sterols for human hormone synthesis, vitamin D synthesis; and even other products which have nutraceutical properties. There is also commercial interest in some products, which present emulsifying properties, emulsion stabilizers and/or viscosity modifiers, such as sterols, in their cosmetic formulas.

The currently known processes for the extraction and concentration of unsaponifiable substances, containing liposoluble vitamins and provitamins, growth factors and vegetable hormones from the residue of industrialized animal or vegetable products, or rather "valuable products", use solvents or solvent mixtures in very large proportions, when compared to the quantity of the material submitted for extraction. These solvents are specific, thus making the process very expensive. Furthermore, the solvents need additional processes for their removal and/or recycling in the extraction and pre-concentration process of the "valuable products", consequently, making these processes harder and more expensive, resulting in a scarce and expensive final product.

Contrary to all the already known processes for the separation and concentration of unsaponifiables, containing the "valuable products", mentioned above, the process presented in this paper, uses no solvents. The process presented herewith, is based on the following steps:

(A) Pre-treatment of the material containing the "valuable products" through saponification with a strong-base material. Partial or complete saponification with the strong-base material is carried out by hydroxides, such as sodium and potassium.

(B) Partial or total transformation of a strong-base soap into a metallic soap with a lower melting point, is accomplished through the reaction of oxides, sulfates, hydroxides, carbonates, chlorides, etc., with metals such as zinc, iron, manganese, magnesium, calcium, aluminum, etc. or other metals that form fluid soaps at temperatures below 180° C. This reaction is carried out directly, by allowing the metal oxide to react with the fatty acid, rosin acid, or any organic acid; or even by double exchange with sulfates or chlorides, transforming sodium and potassium soaps into metallic soaps with lower melting points, thus facilitating industrial handling as well as drying, etc., thus avoiding its degradation during the industrial process.

(C) Drying of the soap through the elimination of water and some volatile substances in the material previously saponified by vacuum distillation/evaporation.

(D) Separation and concentration of the unsaponifiables, contained in low melting point metallic soaps, by means of high vacuum distillation/evaporation, whether by falling film evaporator or by short path evaporation, in temperatures ranging from 100 to 300° C., and by absolute pressure of 5 to $1 \times 10^{-3}$ mbar or below. This distillation/evaporation is carried out in one or more stages, according to the desired degree of concentration or even when fractionation of the unsaponifiable part is required.

(E) Fraction concentration rich in unsaponifiables, by re-vaporation of the material at high vacuum, separating it from light and heavy fractions.

(F) The residue of the distilled unsaponifiables is hydrolyzed using diluted sulfuric acid or hydrochloric acid, in order to obtain fatty acids, rosin acids and other organic acids, presenting low levels of light components and of unsaponifiable materials.

The unsaponifiable sources used in this process are animal or vegetable oils and fats, by-products of the industrialization of the same, or residues from the products of paper and cellulose industry, such as: Tall oil, obtained from the soap of wood processing, for the production of cellulose ("Tall oil black liquor soap skimming"), or the soap itself obtained from cellulose processing, the "Tall oil pitch" (residue from "tall oil" distillation); Sugarcane oil; residues from extraction; degumming, and refining of oils and fats, such as: lecithins, neutralization soap stock, deodorization distillates and physical refining, "hot well" soap stocks, and winterization residues; distillation residues of fatty acids and esters (ethyl, methyl, butyl); coffee oil, fish oil, cod liver oil; animal or vegetable oils and fats rich in unsaponifiable materials, such as: wheat germ oil, corn germ oil, palm oils, andiroba oils, oil from tomato residues and other residues.

The increase in fluidity and decrease of the melting point of viscous materials, like the residue of "Tall oil" (pitch) distillation, can be obtained by blending it with other unsaponifiable residues, before or after the saponification of the Tall oil (pitch) distillation residue, and residues such as vegetable oil neutralization soapstock, Tall oil black liquor soap skimming or other residues or products, which after soap formation, become fluid at a temperature below 200° C. Thus, obtaining better results and better efficiency in the process.

The presence of glycerides (di- or triglycerides) or sucrose-polyesters contribute to decrease the melting point and increase the fluidity of some materials like "Tall oil pitch" soap (Tall oil distillation residue), which could contribute to the process yield. These additives, however, are not essential to the separation process of the unsaponifiables described herewith.

The residues hydrolyzed by diluted sulfuric acid or hydrochloric acid, which are the result of the process described in this patent report, usually come from Tall oil distillation residues, neutralization soapstock residues, animal or vegetable oil and fat deodorization residues, and animal and vegetable oils containing unsaponifiables.

The following tables have the objective of clarifying the process and the examples given.

Table 1 shows the melting points of the zinc, iron and magnesium soaps, and the blends with dry sodium soap from cellulose production "black liquor soap skimming" (BLSS).

Table 2 shows the characteristics of the "tall oil" obtained from hydrolyzed BLSS magnesium soap residue after short path evaporation.

As shown in the results presented in table 1, the transformation of BLSS sodium soap into Zn, Mg, or Fe soaps, decreases the melting point, significantly. The mixture of sodium or potassium soaps with Zn, Mg, Fe soaps, either formed by partial transformation of sodium soaps, or by their blending, also decreases the melting point.

Next, some examples of extraction and concentration of unsaponifiable substances, containing lyposoluble vitamins and provitamins, growth factors, and vegetable hormones from residues of industrialized animal and vegetable products. In other words, the extraction and concentration process of the "valuable products", without the use of solvents obtained through the process presented in this report, will be described.

EXAMPLE 1

5 Kg of black liquor sodium soap skimming (BLSS) with 50% humidity, obtained from the process of cellulose production, was diluted with 50% water and transformed into magnesium soap with magnesium sulfate, calculated with approximately a 30% excess margin. The transformation was carried out in a stirrer and heater reactor. Reaction temperature was maintained at 80–95° C. When most of the sodium soap is transformed into magnesium soap, the phase separation occurs. After that, the water phase containing an excess of sodium and magnesium sulfate from BLSS, was separated from the magnesium soap, by decantation. Magnesium soap was dried under reduced pressure, at a temperature of 90–150° C., for 40 minutes. The dry soap was then filtered in order to remove solid material, after which, it was evaporated/distilled in short path evaporation pilot equipment. The pilot evaporator used, was made of glass and had 4.8 dm$^2$ of evaporation/distillation surface with a variable temperature of 25–350° C., and an internal superficial scraper stirrer with a variable rotation of 50–1000 rpm, and a 6.5 dm$^2$ surface internal condenser with an adjustable temperature of 25–250° C. The equipment also had a feeding system with a 0.1–5 liter/h adjustable pump and a feeding vessel with an adjustable temperature of 25–250° C. It was also equipped with a two stage high vacuum system, in which the pre-vacuum is formed by a mechanical pump and the final vacuum is obtained by a molecular diffusion pump, where the absolute pressure can be adjusted from atmospheric pressure up to $1\times10^{-3}$ mbar. The concentration of sterols in the soap was carried out through various short path evaporation stages. The first evaporation was carried out at around 280–300° C., feeding flow was maintained at 1 to 1.5 1/h, evaporation pressure was $1\times10^{-3}$ mbar absolute, the temperature of the internal condenser was maintained at 70–80° C., and feeding temperature at 150–170° C. Under these conditions, yields of 84% and 16%, for residue and distilled product respectively, were obtained. Practically all of the sterols in the soap, have been distilled and concentrated in the distilled product, the concentration of which were 0.9 and 20.3% for the residue and the distilled product, respectively. The first distilled product obtained was re-distilled at a temperature of 280° C., maintaining the same parameters as those in the beginning. This second distillation was 1.6% and 14.4% for the residue and the distilled product respectively, in comparison to the initial material. In this second distillation, the sterols were concentrated in the distilled product. The residue and the distilled product showed a concentration of 1.6% and 22.4% respectively for sterols. The distilled product from the second distillation was put through a third distillation, at a temperature of 160° C. The objective of the third distillation was to remove the acidity and low boiling point components. With regards the initial material used, the last yields for residue and distilled product, during the final distillation process, were 8.4% and 6.0%, respectively. Total sterol concentrations in these fractions were 35.4% in the residue and 4.23% in the distilled product. The increase of sterols in the residue of the third distillation was 8.9 times greater than in the beginning, where total sterols were 4%. The total sterol recovery yield, in this experiment, was 80%. An extremely good quality "Tall oil" was obtained after the acid hydrolysis of the residue from the first distillation. This improvement in the quality of the "Tall oil" obtained, compared to that produced by direct hydrolysis of BLSS sodium soap, is due to the removal of most of the neutral substances and unsaponifiables before hydrolysis, in other words, in the distillation. An analysis of the "Tall oil" obtained from the hydrolysis of the residue taken from the first distillation, is shown in table 2.

EXAMPLE 2

5 Kg of soybean oil deodorizer distillated (DDOS) was used, then saponified under 2 Kg/cm pressure at a temperature of 120° C., using 1.4 Kg of 50% sodium hydroxide solution for 2 hours. Next, sodium soap was diluted in 5 Kg of water, after which, it was transformed into magnesium soap by reacting with 30% calculated excess magnesium sulfate solution. The transformation was carried out in a stirrer reactor at a temperature of 90–95° C. After the reaction, the water phase was removed from the magnesium soap by means of decantation. Next the soap was dried under reduced pressure at a temperature of 90–140° C. After that the dry soap was filtered and submitted to various stages of short path evaporation. The first distillation/evaporation was carried out using the same parameters mentioned in Example 1. The yields from the residue and the distilled product, taken from the first distillation/evaporation, were 63% and 37%, respectively. Tocopherols and sterols concentrate in the distilled product and their values were 8.0% and 10.4%. In the residue, tocopherols and sterols were found in concentrations of 0.4% and 1.37%, respectively. The first distilled product was submitted to a second distillation/evaporation at 280° C., in order to separate the remaining soap in the first distilled product. In this second distillation, the residue and distilled product yields were 2.6% and 34.4%, when compared to the initial material. Total tocopherol and sterol concentrations, in the distilled product, were 8.5% and 11.4%, respectively. The concentrations of tocopherols and sterols, in the residue, were 0.38% and 0.24% respectively. The second distilled product was once again redistilled at 140° C., maintaining all other parameters according to the conditions presented in Example 1. In this distillation, the residue and distilled product yields were 21.6% and 12.8% respectively compared to the initial material. Tocopherol and sterol concentrations in the residue were 13.0% and 17.9%, respectively. On the other hand, tocopherol and sterol concentrations, in the distilled product, were 0.93% and 0.50% respectively. This represents an increase of 4 times the amount of tocopherol and 3.7 times that of sterol, with a recovery of 87.8% and 80.5%, in relation to the starting material.

EXAMPLE 3

5 Kg of Tall oil pitch underwent hydrolysis with high-pressure steam for 2 hours. The hydrolyzed pitch suffered evaporation/distillation at 280° C. Residue and distilled product yields were 35% and 65%, respectively. The hydrolyzed pitch distilled product was neutralized, without excess, with a magnesium oxide suspension in water, at 95° C. for 3 hours. The magnesium soap was dried under reduced pressure and submitted to short path evaporation at a temperature of 280° C. Residue and distilled product yields were 37% and 63% respectively. Sterols were concentrated in the distilled product. The proportion of sterols in the residue and distilled product were 0.8% and 39.5% respectively. This represents an increase of 3.9 times more than in the concentration of the initial material. The sterol recovery obtained in this experiment was 79%.

The examples mentioned above clearly show some of the ways of accomplishing, solidifying and making the process viable, as well as the yield and the advantages of this process, which is the objective of the present patent, showing its importance not only in obtaining "valuable products", but also for the use of discarded residue materials, and consequently environmental preservation.

Thus, based on the above mentioned characteristics both in the process and in the results, the "PROCESS FOR THE EXTRACTION AND CONCENTRATION OF LIPO-SOLUBLE VITAMINS AND PROVITAMINS, GROWTH FACTORS AND ANIMAL AND VEGETABLE HORMONES PRESENT IN RESIDUES AND BY-PRODUCTS OF INDUSTRIALIZED ANIMAL AND VEGETAL PRODUCTS", presented in this report, which consists of saponification, or of the total or partial neutralization of the initial material used with posterior transformation of sodium soaps into reduced melting point metallic soaps, making the separation of unsaponifiable elements and their use, in terms of obtention of valuable products for the industry in general, possible. It is a new State of the Art process. Thus, making it viable for protection as a Patent Invention.

TABLE 1

| % Zn SOAP FROM BLSS | % Na SOAP FROM BLSS | MELTING POINT (° C.) |
| --- | --- | --- |
| 0 | 100 | 230 |
| 28 | 72 | 170 |
| 44 | 56 | 128 |
| 61 | 39 | 96 |
| 100 | 0 | 81 |

| Fe SOAP FROM BLSS | % Na SOAP FROM BLSS | MELTING POINT (° C.) |
| --- | --- | --- |
| 0 | 100 | 230 |
| 28 | 72 | 171 |
| 44 | 56 | 140 |
| 61 | 39 | 120 |
| 100 | 0 | 60 |

| % Mg SOAP FROM BLSS | % Na SOAP FROM BLSS | MELTING POINT (° C.) |
| --- | --- | --- |
| 0 | 100 | 230 |
| 28 | 72 | 170 |
| 44 | 56 | 140 |
| 61 | 39 | 115 |
| 100 | 0 | 95 |

| TALL OIL | DIRECT ACIDULATION | SUBMITTED TO THE INVENTION |
| --- | --- | --- |
| ACID VALUE, mg KOH/g | 145.0 | 178.0 |
| SAPONIFICATION VALUE, mg KOH/g | 155.0 | 182.0 |
| UNSAPONIFIABLES (%) | 16.0 | 3.3 |
| NEUTRALS (%) | 17.0 | 3.9 |
| ROSIN ACIDS (%) | 39.0 | 36.8 |
| GAS CROMATROGRAPHY | | |
| FATTY ACID COMPOSITION | % | % |
| PALMITIC ACID | 5.2 | 4.8 |
| STEARIC ACID | 2.0 | 1.3 |
| OLEIC ACID | 28.0 | 26.4 |
| LINOLEIC ACID | 22.0 | 19.2 |
| ABIETIC ACID | 17.3 | 15.2 |
| DEHYDROABIETIC ACID | 5.0 | 8.4 |

What is claimed is:

1. A process for extracting and concentrating unsaponifiable components of a starting material having both saponifiable and unsaponifiable components, wherein the starting material is one of an animal or vegetable product, or a by-product or waste product resulting from processing of animal or vegetable products, the process comprising:

partially or completely saponifying the saponifiable components of the starting material with a strong base, whereby some or all of the saponifiables therein are converted to their corresponding salts or soaps;

reacting the salts or soaps formed from reaction with the strong base with salts or oxides of one or more metals to form a mixture comprising unsaponifiable components and salts or soaps having a lower melting point than the salts or soaps formed from reaction with the strong base;

drying the mixture;

separating the mixture into unsaponifiable components and a residue; and concentrating the unsaponifiable components.

2. The process of claim 1, further comprising hydrolyzing the salts or soaps in the residue.

3. The process of claim 1, wherein the salts or soaps formed by reaction with a strong base are reacted with salts or oxides of one or more metals selected from the group consisting of zinc, iron, manganese, magnesium, calcium, and aluminum.

4. The process of claim 1, wherein the drying is performed by evaporation or distillation under reduced pressure or vacuum.

5. The process of claim 1, wherein the separating is performed using a falling film evaporator or a short path evaporator.

6. The process of claim 1, wherein the separating is performed at a temperature of from 100–350° C. and a pressure of 5 mbar or less.

7. The process of claim 1, wherein the lower melting point salts or soaps have a melting point below 180° C.

8. The process of claim 1, further comprising pre-treating the starting material to hydrolyze neutral components to form their corresponding acids prior to saponification.

9. The process of claim 1, wherein the starting material is selected from the group consisting of tall oil, tall oil black liquor soap skimming, tall oil pitch, sugar cane oil, lecithins, neutralization soap stock, deodorization distillates, winterization residues, distillation residues of fatty acids and esters, coffee oil, fish oil, soybean oil, cod liver oil, wheat germ oil, corn germ oil, palm oil, andiroba oil, and oil from tomato residues.

10. The process of claim 1, wherein the unsaponifiable components comprise tocopherols, tocotrienols, carotenoids, vitamin A, vitamin K, vitamin D, lipoproteins, provitamins, growth factors, sterols, and lycopene.

11. A process for improving the processability of a starting material having both saponifiable and unsaponifiable components, wherein the starting material is one of an animal or vegetable product, or a by-product or waste product resulting from processing of animal or vegetable products, the process comprising:

partially or completely saponifying the saponifiable components of the starting material with a strong base, whereby some or all of the acids therein are neutralized to form at least one of sodium and potassium salts or soaps; and reacting the sodium and/or potassium salts or soaps of the animal or vegetable product with salts or oxides of one or more metals other than sodium or potassium to form salts or soaps having a melting point below 180° C., whereby the lower melting point of the salts or soaps allows for processing of the product by distillation and/or evaporation.

12. The process of claim 11, wherein the potassium and/or sodium salts or soaps are reacted with salts or oxides of one or more metals selected from the group consisting of zinc, iron, manganese, magnesium, calcium, and aluminum.

13. The process of claim 11, wherein the lower melting point salts or soaps have a melting point below 180° C.

14. The process of claim 11, wherein the starting material is selected from the group consisting of tall oil, tall oil black liquor soap skimming, tall oil pitch, sugar cane oil, lecithins, neutralization soap stock, deodorization distillates, winterization residues, distillation residues of fatty acids and esters, coffee oil, fish oil, soybean oil, cod liver oil, wheat germ oil, corn germ oil, palm oil, andiroba oil, and tomato oil.

15. A process for extracting and concentrating components of a starting material having both saponifiable and unsaponifiable components, wherein the starting material is one of an animal or vegetable product, or a by-product or waste products resulting from processing of animal or vegetable products, the process comprising:

partially or completely saponifying the saponifiable components of the starting material with a strong base of at least one of sodium and potassium thereby forming a first mixture comprising at least one of potassium and sodium salts or soaps;

reacting the first mixture with salts or oxides of one or more metals selected from the group consisting of zinc, iron, manganese, magnesium, calcium, and aluminum to form a second mixture comprising soaps or salts having a melting point below that of the potassium and/or sodium salts or soaps;

drying the second mixture;

separating second mixture into unsaponifiable components and a residue; concentrating the unsaponifiable components; and hydrolyzing the salts or soaps in the residue.

16. The process of claim 15, wherein the separating is performed using a falling film evaporator or a short path evaporator.

17. The process of claim 15, wherein the separating is performed at a temperature of from 100–350° C. and a pressure of 5 mbar or less.

18. The process of claim 15, wherein the lower melting point salts or soaps have a melting point below 180° C.

19. The process of claim 15, wherein the starting material is selected from the group consisting of tall oil, tall oil black liquor soap skimming, tall oil pitch, sugar cane oil, lecithins, neutralization soap stock, deodorization distillates, winterization residues, distillation residues of fatty acids and esters, coffee oil, fish oil, soybean oil, cod liver oil, wheat germ oil, corn germ oil, palm oil, andiroba oil, and oil from tomato residues.

20. The process of claim 15, wherein the unsaponifiable components comprise tocopherols, tocotrienols, carotenoids, vitamin A, vitamin K, vitamin D, lipoproteins, provitamins, growth factors, sterols, and lycopene.

21. A process for extracting and concentrating unsaponifiable components of a starting material having both saponifiable and unsaponifiable components, wherein the starting material is one of an animal or vegetable product, or a by-product or waste product resulting from processing of animal or vegetable products, the process comprising:

reacting the saponifiable components of the starting material with a metal oxide, thereby forming a mixture wherein some or all of the saponifiables therein are converted to their corresponding salts or soaps;

drying the mixture;

separating the mixture into unsaponifiable components and a residue; and concentrating the unsaponifiable components.

* * * * *